Aug. 21, 1956

J. T. HALL ET AL 2,759,521

APPARATUS FOR MAKING FLEXIBLE HOSE

Filed May 5, 1954

INVENTORS
Joseph T. Hall
Roland F. Mahoney
BY
John C. Blair
ATTORNEY

Aug. 21, 1956　　　　J. T. HALL ET AL　　　　2,759,521
APPARATUS FOR MAKING FLEXIBLE HOSE
Filed May 5, 1954　　　　　　　　　　　　5 Sheets-Sheet 3

INVENTORS
Joseph T. Hall
Roland F. Mahoney
BY
John C. Blair
ATTORNEY

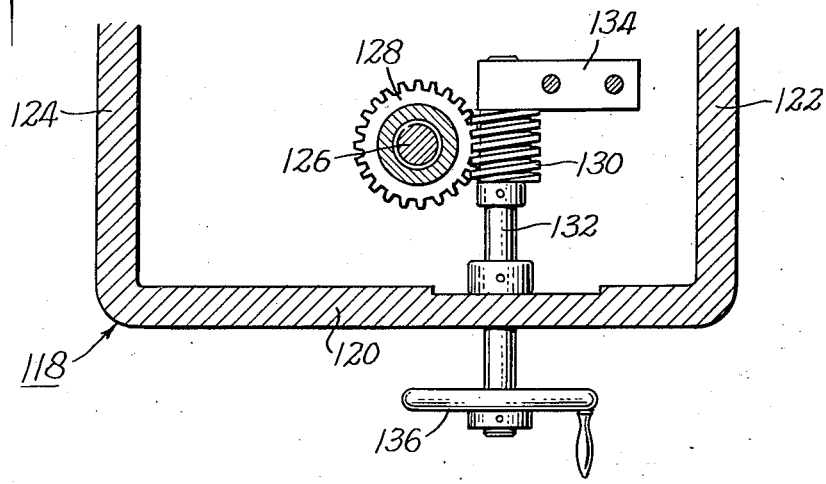
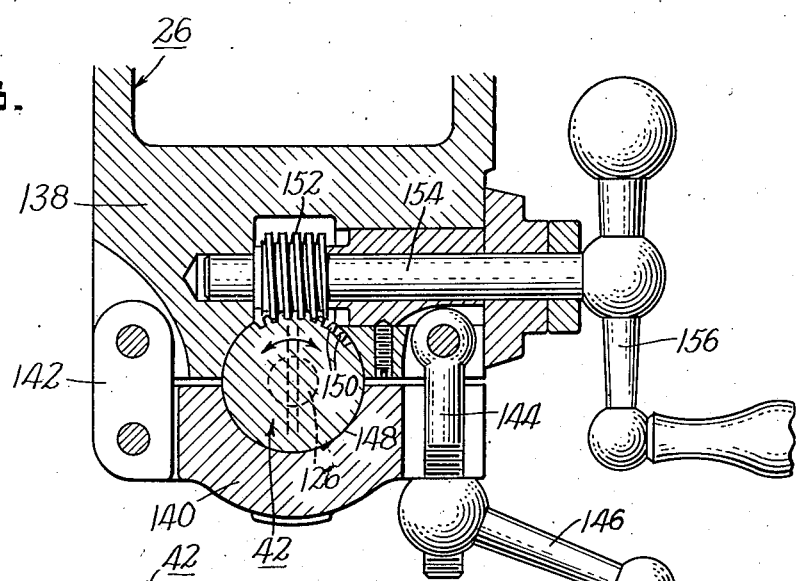
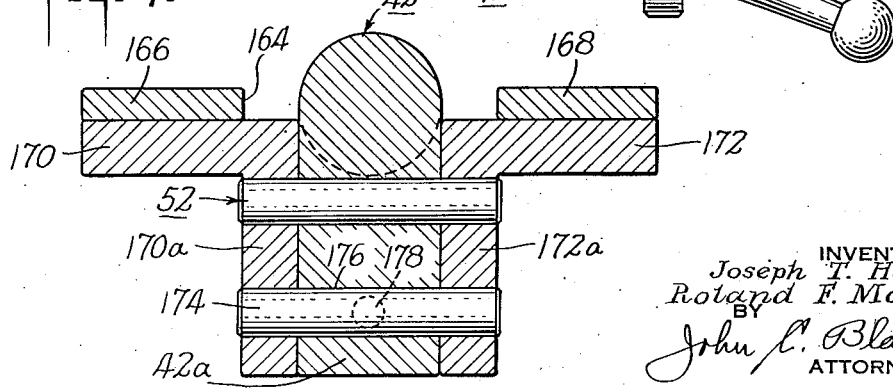

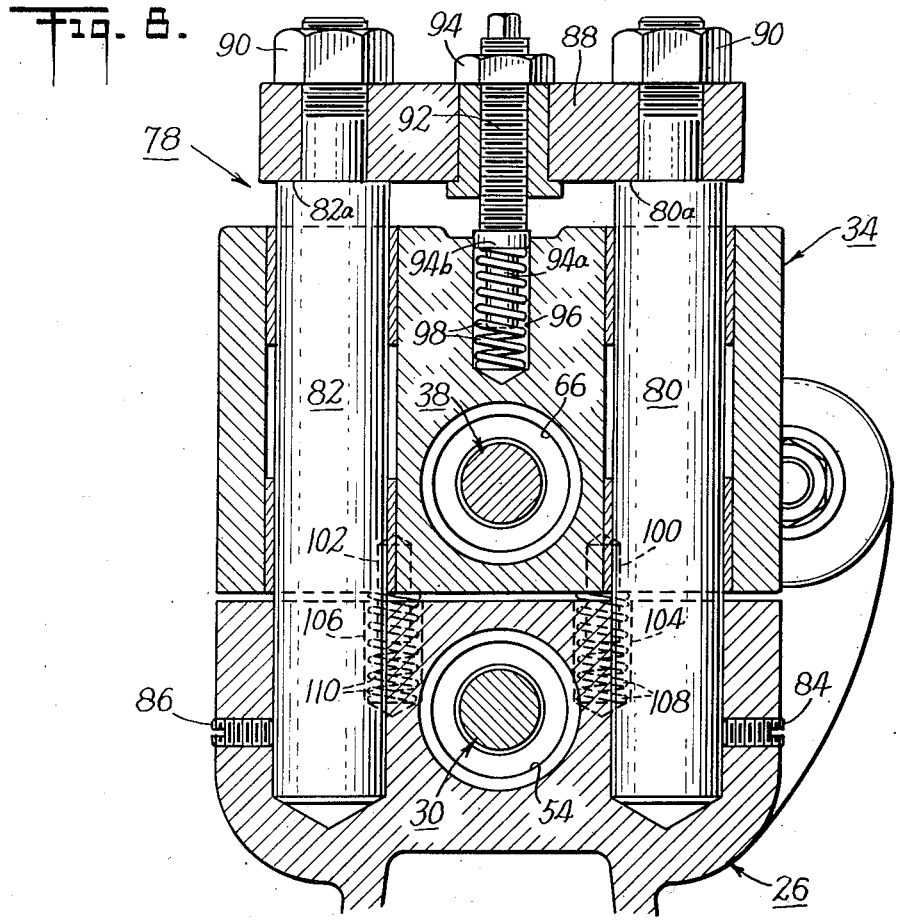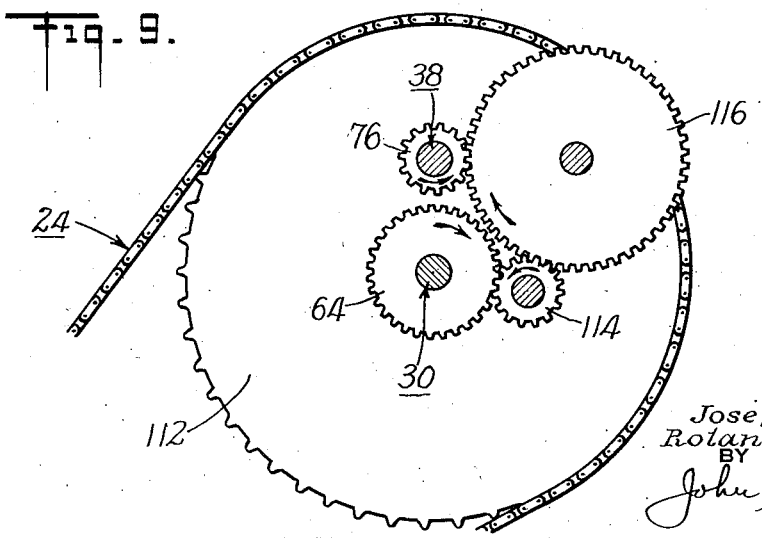

United States Patent Office 2,759,521
Patented Aug. 21, 1956

2,759,521

APPARATUS FOR MAKING FLEXIBLE HOSE

Joseph T. Hall, Stamford, Conn., and Roland F. Mahoney, Amesbury, Mass., assignors to Callahan Zinc-Lead Company, Incorporated, New York, N. Y.

Application May 5, 1954, Serial No. 427,836

9 Claims. (Cl. 154—7)

This invention relates to an apparatus and method for continuously forming a flexible hose from an adhesive tape by helically winding such tape in overlapping relation.

More particularly, this apparatus will automatically make the type of hose described in Patent No. 2,486,387 to R. G. Bringolf. In fact, the apparatus and method to be disclosed in this application are improvements, respectively of the apparatus described and claimed in Patent Nos. 2,674,296 and 2,486,387 to R. G. Bringolf.

The tape from which this flexible hose is formed is continuous, ribbon-like, flexible, and adhesive, preferably reinforced with wire on one edge. Such flexible hose is fully described in Patent No. 2,674,296; briefly, it comprises a series of helical overlapping loops held together by the adhesive character of the tape to form the hose. The apparatus as shown in the patent includes a pair of superimposed grooved, driven rollers having free ends. The tape is fed between the nip of the rollers, looped back on itself and the end thereof re-fed therethrough while overlapping the edge of the tape being fed into the machine. The pressure of the rolls causes the overlapping edges of the strip to adhere and thus rotation of the rolls continuously forms a hose comprising helical sections adhesively secured together. Hose so formed gradually feeds along the rolls and leaves the free ends thereof in a direction which is generally axial with respect thereto.

As the hose is being so formed its top portion is considerably spaced from the top of the top roller and in the above Bringolf patents it is unsupported. While hose may be formed in this manner successfully, there are certain difficulties inherent in the operation of such apparatus which serve to increase the cost of manufacture and the quality of the resultant product. This lack of support makes it difficult to control the diameter of the completed hose accurately, sometimes leading to diameter variation along the length of the completed hose. Also at times the loops are not properly joined because they are not fed into overlapping relationship accurately; this results in costly shut-downs and waste of material. Machines lacking this support must be operated slowly to avoid shut-downs, size variation, and inferior quality of resulting product.

A general object of the present invention is to provide an improved apparatus which will continuously form flexible hose in the manner described in said Bringolf patents, but which does so with much greater accuracy, far fewer shut-downs and a marked increase in speed of operation. It is a further general object of this invention to provide an apparatus of the above character which is simple in design, making for economy in construction, and yet which may be easily adjusted to suit the particular production needs as to size characteristics and quality of hose to be made.

A more specific object of the invention is the provision of apparatus of the above character having suitable supporting devices located above the rolls and designed to support the upper free portion of the hose as it is formed by the rolls and to guide it more accurately during such formation, thereby assuring a hose of uniform dimensions with proper overlapping relationship of adjacent loops and proper aherence thereof.

Other objects of the invention will be in part obvious and will in part be pointed out hereinafter.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

For fuller understanding of the nature and objects of the invention, reference should be had to the following detailed description taken in connection with the accompanying drawings, in which:

Figure 5 is a horizontal sectional view taken along the lines 5—5 of Figure 1.

Figure 6 is a horizontal sectional view taken along the lines 6—6 of Figure 1.

Figure 7 is a horizontal sectional view taken along the lines 7—7 of Figure 1.

Figure 8 is an enlarged fragmentary vertical section of a portion of the apparatus taken along the lines 8—8 of Figure 2.

Figure 9 is a fragmentary vertical sectional view taken along the lines 9—9 of Figure 2.

Similar reference characters refer to similar parts throughout the several views of the drawings.

Figure 1:
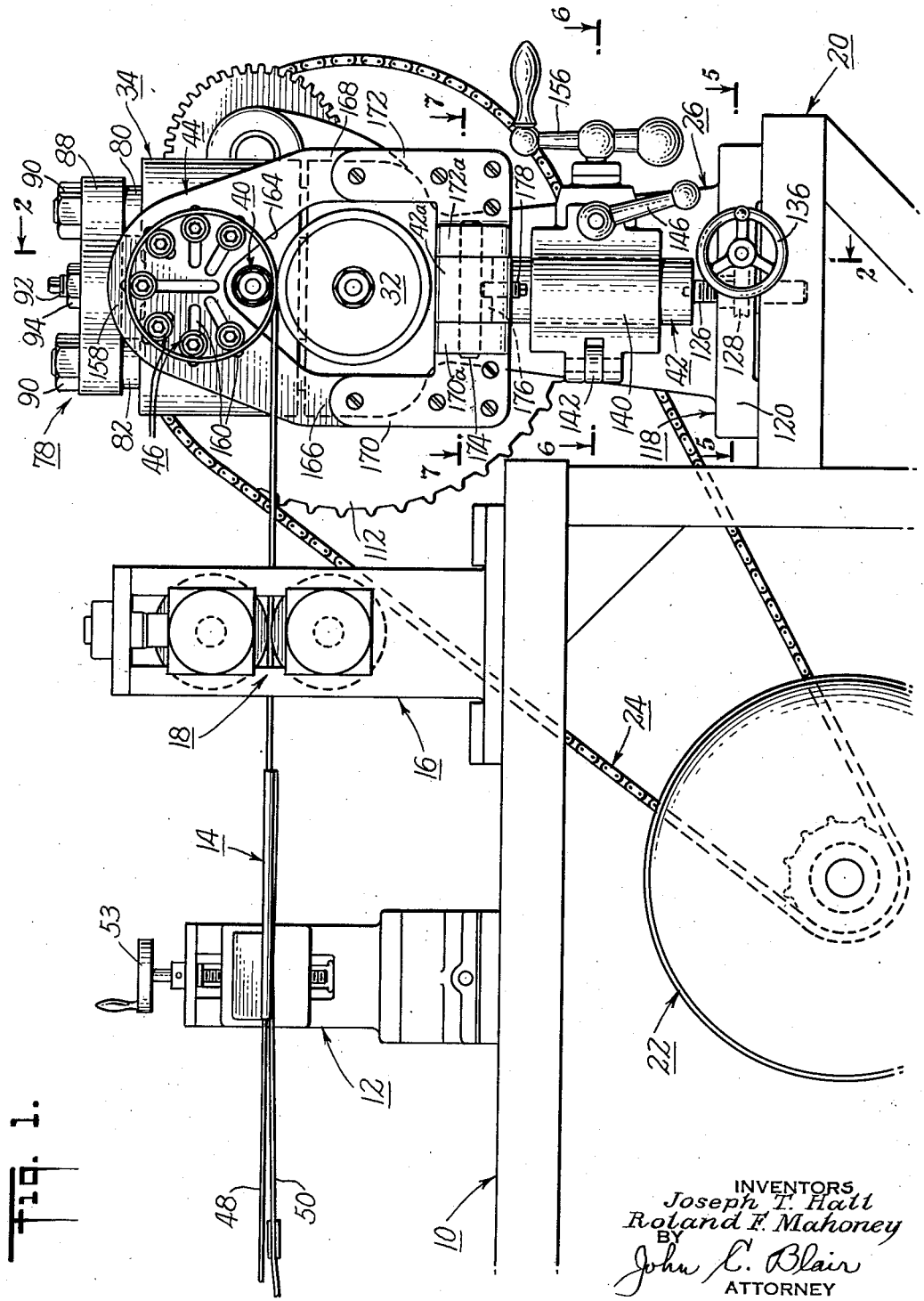
Figure 1 is a front elevation of the apparatus assembled and ready for the manufacture of flexible hose.

Referring now to the drawings and particularly to Figure 1, the machine comprises a table generally indicated at 10 upon which is mounted an adjustable support generally indicated at 12 for a tape-folding guide generally indicated at 14. The table 10 also includes a stand generally indicated at 16 for supporting a pair of tape guiding rollers generally indicated at 18 which may be resiliently urged toward each other. On the right of table 10 is a shelf generally indicated at 20 which supports the apparatus for continuously forming flexible hose from the tape as will be described in detail. Such apparatus may be driven by a suitable motor generally indicated at 22 by way of a chain drive generally indicated at 24.

Figure 2:
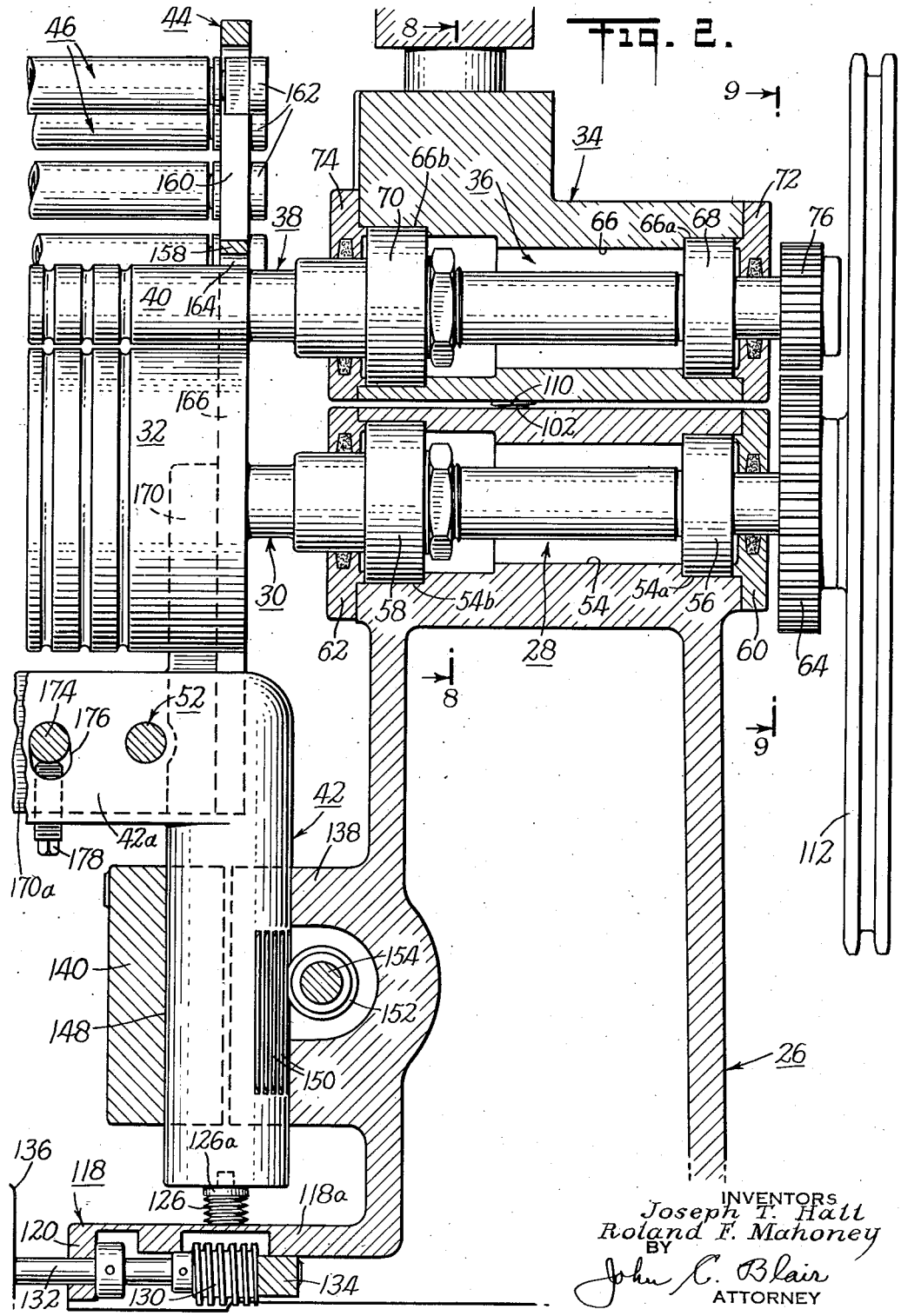
Figure 2 is a fragmentary enlarged vertical section of certain of the apparatus shown in Figure 1 and taken along the lines 2—2 of Figure 1.

The apparatus for continuously winding the hose may best be understood by reference to Figures 1 and 2 where the base generally indicated at 26 which is mounted on the shelf 20 includes a bearing structure generally indicated at 28 (Figure 2) which rotatably supports a shaft generally indicated at 30 upon which is mounted the lower forming roll generally indicated at 32 (Figures 1 and 2). An upper bearing casing generally indicated at 34 (Figures 1, 2, and 8) is resiliently urged toward the top of support 26 in a manner to be described more fully hereinafter and includes a bearing structure generally indicated at 36 (Figures 2 and 8) for rotatably supporting a shaft generally indicated at 38 on which is mounted the upper forming roll generally indicated at 40 (Figures 1 and 2).

A stud shaft generally indicated at 42 (Figures 1 and 2)

is rotatably mounted in base 26 in a manner to be more fully described later. Swingably mounted on the upper end of shaft 42 is a plate or frame generally indicated at 44 on which are mounted a series of supporting rollers generally indicated at 46. It will be apparent from a consideration of Figures 1, 2, 3, and 4 that rollers 46 extend away from the plate or frame 44 in substantially the same direction as rolls 32 and 40 and they are substantially arcuately disposed in spaced relation above upper forming roll 40.

Figure 3:
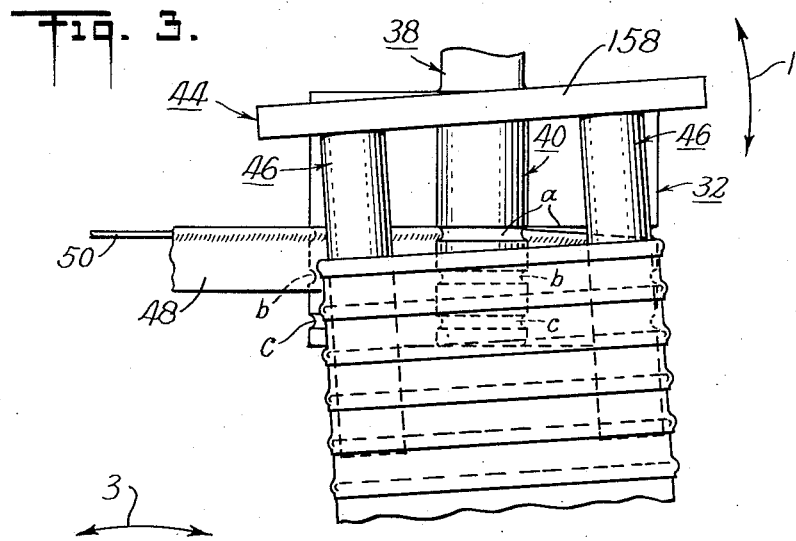
Figure 3 is a fragmentary diagrammatic top plan view of that portion of the apparatus where the first several loops of the reinforced tape are helically wound in overlapping relationship to adhere and thus form the completed hose.
Figure 4:
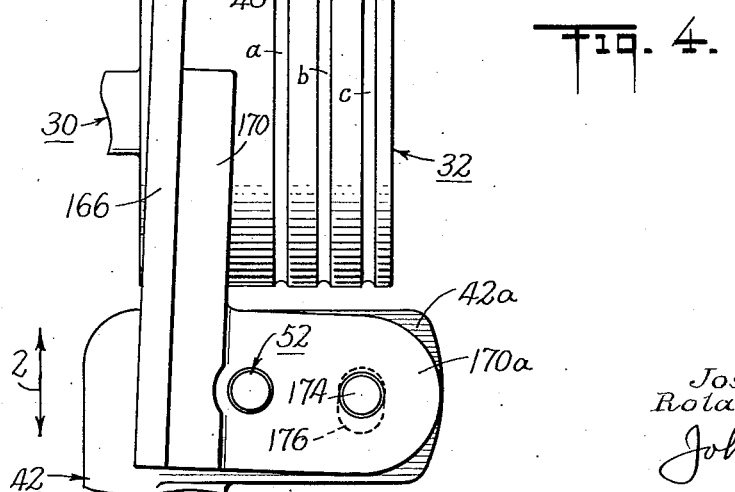
Figure 4 is a fragmentary diagrammatic side elevation of that portion of the apparatus shown in Figure 3.

In operation the tape 48 and the wire 50 are fed from the left as viewed in Figure 1 through the folding guide 14 where one edge of the tape is folded over the wire in overlapping relation. The tape and the wire then continue through rollers 18, where due to the adhesive characteristic of the tape its overlapping portions adhere to form a unit, the wire 50 acting as a reinforcement along one edge i. e. the left edge as viewed in Figure 4. The tape in this form is fed into the nip of rolls 32 and 40 as best seen in Figure 4. Thus the reinforced edge including wire 50 rests in aligned grooves $a$ of the rolls 32 and 40. As the tape is fed between the rollers its free end is looped back over the upper roll 40 in helical fashion as can be visualized by considering Figures 3 and 4. As this feeding continues the free end of the tape again faces the same nip of rolls and the reinforced edge is now fed into the aligned grooves $b$ in the rolls in which position it overlaps the free or nonreinforced edge of the tape being initially fed onto the rolls as described above. The reinforced tape continues around in helical fashion in the same manner until the free end loops back to face again the nip of the rolls, but this time the reinforced edge is fed into the aligned grooves $c$ thereof. Grooves $a$, $b$, and $c$ and corresponding grooves further along the rolls 32 and 40 are equally spaced and consequently each time the free end loops helically around to face the nip of the rolls, it enters a new groove to the right as viewed in Figure 4. This action continues as rolls 32 and 40 rotate with the loops of reinforced tape overlapping each other and being pressed together to adhere due to the adhesive character of the tape. Finally, the end of the hose so formed by a series of these helical loops feeds axially off the free ends of the rolls and continued rotation thereof forms the flexible hose continuously; the completed hose thus feeds out away from the machine or to the right as viewed in Figure 4.

It will be appreciated that as the reinforced tape is fed through rolls 32 and 40 and is looped back on itself as described above there is a considerable space between the top of roll 40 and the inner side of the loops being formed; consequently there is a possibility of loop deformation. This difficulty is increased as the adjacent loops are formed into a length of hose. As a consequence it is not only desirable to support this upper free portion of the hose being formed, but support it in a special manner so that the loops will regularly conform to desired dimensions and to assure a uniform feeding speed along the rolls. To this end plate or frame 44 is provided having extending therefrom the rollers 46 which, as best seen in Figures 3 and 4, extend beneath the first several loops of the hose being formed and act as a support during initial hose formation. Not only do the rollers 46 act in this supporting capacity, but they also guide this portion of the hose including the newly formed loops in proper direction so that the completed hose may feed at a regular speed and evenly along rolls 32 and 40.

To perform this supporting and guiding function it is necessary to have these rolls adjustable in several directions with respect to the rolls 32 and 40 and the hose being formed thereby, and, as will be explained more fully hereinafter, such adjustment in several directions is incorporated in this apparatus. Plate or frame 44 is secured to study shaft 42, as described above with respect to Figures 1 and 2, and by way of mechanism to be described hereinafter. The plate may then pivot about the axis of this stud shaft or in the direction indicated by the arrow 1 in Figure 3. Further plate or frame 44 may be adjusted vertically (see arrow 2 in Figure 4) by moving the shaft 42 up and down by mechanism to be described hereinafter. Further still, plate or frame 44 is pivotally supported on a stud shaft generally indicated at 52 (Figure 4), and consequently may pivot about a horizontal axis as indicated by the arrow 3 in Figure 4. By proper manipulation of these various adjustments in the three directions indicated by the arrows in Figures 3 and 4 rolls 46 may be placed in exactly the desired position to properly support the particular size of hose being formed by the rolls 32 and 40 and to guide such hose during its initial stages of formation so that it may feed uniformly along the rolls and off the free ends thereof.

Referring now to Figure 1 the folding guide 14 may take any suitable shape preferably having two spaced horizontal sides designed so that as the tape 48 and the wire 50 are fed therethrough the far side of the tape as viewed in Figure 1 folds over the wire and leaves the right side of the guide to pass between the rollers 18 so folded. Pressure exerted on the tape by rollers 18 causes the overlapping portions of the tape to adhere and consequently tape and wire feed toward rolls 32 and 40 as a unit. Folding guide 14 is adjustable vertically by way of the hand wheel 54 and associated mechanism to direct the tape to the rollers 18 which are also adjustable so that the reinforced tape feeds directly into the nip of the rollers 32 and 40.

As can best be seen in Figure 2 the bearing structure 28 for rotatably supporting the shaft 30 comprises a cylindrical bore 54 formed in the upper central portion of the base 26 with annular grooves 54a and 54b adjacent the opposite ends thereof for supporting bearings 56 and 58 held in assembled relation by caps 60 and 62. Thus shaft 30 is rotatably supported in bearings 56 and 58 and has secured at one end roll 32 beneath roll 40 while its opposite end extends from the rear of base 26 with a pinion 64 keyed or otherwise secured thereto.

Bearing casing 34 has a similar cylindrical bore 66 with annular grooves 66a and 66b adjacent the ends thereof. Thus bearings 68 and 70 are supported in grooves 66a and 66b and held in such position by caps 72 and 74 at the opposite ends of the bore. Roll 40 is secured to the front end of shaft 38 and the rear end thereof has a pinion 76 keyed or otherwise secured thereto, and as can be seen more clearly in Figure 8, bearing casing 34 is spring pressed toward the top of base 26 to urge roll 40 against roll 32. Thus a yoke generally indicated at 78 comprises a pair of legs 80 and 82 extending into the top of base 26 and secured in this position by set screws 84 and 86. A cross piece 88 bridges legs 80 and 82 resting upon shoullders 80a and 82a thereof and is held in this position by nuts 90 threaded on the reduced ends of legs 80 and 82. A stud bolt 92 is adjustably secured to cross piece 88 by lock nut 94 and the lower end 94a thereof is reduced to provide a shoulder 94b in alignment with a hole 96 in bearing casing 34. A spring 98 is interposed between the bottom of hole 96 and shoulder 94b. This spring 98 being under compression resiliently urges casing 34 and consequently the roll 40 downwardly or against roll 32. Studs 100 and 102 also extend from the bottom of casing 34 into holes 104 and 106 with compression springs 108 and 110 seated therein. Thus springs 108 and 110 act against springs 98 and consequently by adjustment of the nut 94 the desired amount of spring pressure between rolls 32 and 40 may be obtained; this adjustment may be easily changed for different sizes of hose, types of tape, etc.

As seen in Figure 1 the motor 22 drives a sprocket wheel 112 which is secured to shaft 30 (Figure 2) and hence drives pinion 64 which is secured thereto as shown in Figures 2 and 9. Pinion 64 drives pinion 76 through pinions 114 and 116 as can be seen in Figure 9. Consequently, as indicated by the arrows in Figure 9, rotation of the sprocket wheel 112 by the motor 22 rotates shaft 30 and roll 40 in a clockwise direction as viewed therein while shaft 38 and roll 40 are driven in the opposite or counterclockwise direction. Accordingly, rolls 40 and 32 being driven in opposite directions will receive in their nip the tape 50 and feed it therethrough to form the hose as described.

As previously described with reference to Figures 3 and 4, rollers 46 supported on plate or frame 44 may pivot about vertical and horizontal axes and are also adjustable vertically. The structure for making this possible will now be described in detail. Referring now to Figures 1 and 2, base 26 has a forwardly extending portion 118 including a front piece 120 and sides 122 and 124 (Figure 5). A threaded shaft 126 (Figures 2 and 5) is threadably mounted in the top 118a of portion 118 and stud shaft 42 rests on the reduced end 126a of shaft 126. As will be described in greater detail later, the plate or frame 44, which supports the rollers 46 (Figure 2) is secured to stud shaft 42 by stud shaft 52 (Figures 2 and 7). Consequently, any vertical movement of stud shaft 42 imparts such movement to plate or frame 44 and rollers 46 and any such movement is relative to the fixed position of rollers 32 and 40; thus, rollers 46 are made adjustable with respect to forming rolls 32 and 40. Because stud shaft 42 rests on shaft 126 the vertical movement of the latter will effect vertical adjustment of rollers 46. As can be seen in Figure 5 a pinion 128 is keyed to shaft 126 and meshes with a worm 130 keyed to shaft 132 rotatably mounted in front piece 120 and bearing strap 134. Rotation of a hand wheel 136 rotates shaft 126 through pinion 128 and worm 130 and, because of its threaded relation with top 118a of forwardly extending portion 118, shaft 126 moves up or down to move stud shaft 42 and roller supporting plate or frame 44 in a like direction.

Referring now to Figures 2 and 6, a block 138 extends forwardly from the front of base 26 and is located above forwardly extending portion 118. A bearing plate 140 is pivotally connected to block 138 by hinge member 142 and is held in seated or closed position by a stud bolt 144 pivotally connected to block 138. Bolt 144 rests in a horizontal groove (not shown) in bearing plate 140 and is held in the closed position shown in Figure 6 by a handle 146 threaded thereon. A vertical bore 148 formed in block 138 and bearing plate 140 supports stud shaft 42 for sliding and rotatable movement when the bearing plate is in its closed position. Teeth 150 (Figures 2 and 6) are formed in shaft 42 to mesh with a worm 152 mounted on a shaft 154 which in turn is rotatably mounted in the block 138 carrying a handle 156. Accordingly, upon rotation of the shaft 154 by way of handle 156 stud shaft 42 may be rotated around a vertical axis in either direction and such movement imparts like motion to plate or frame 44 and rollers 46 mounted thereon.

As best seen in Figure 1, plate or frame 44 comprises a supporting portion 158 suspended above rolls 40 and 32 and having formed therein a series of radial slots 160. Rollers 46 are mounted on shafts and bearings in a well-known manner for rotation about such shafts; threaded extensions thereof extending through the slots 160 and such assemblies are held in desired position by nuts 162 (Figures 1 and 2). By adjusting the nuts 162 rollers 46 may be moved to any desired position along the slots 160 and fixed in such position.

Referring to Figure 1 plate or frame 44 has formed therein an opening 164 with vertical downwardly depending legs 166 and 168 straddling rollers 32 and 40. Legs 166 and 168 are connected to bracket pieces 170 and 172 which, as can be seen in Figure 7, have horizontal extensions 170a and 172a adjacent a horizontally disposed right angle extension 42a of stud shaft 42. Stud shaft 52 extends through extensions 42a, 170a and 172a to pivotally support plate or frame 44 about a horizontal axis (Figure 2) as has been described. A stud 174 is carried by extensions 170a and 172a and passes through a vertical slot 176 in extension 42a while a setting bolt 178 is threaded into the extension 42a to project into slot 176. Thus adjustment of bolt 178 moves stud 174 vertically to pivot extensions 170a and 172a about stud shaft 52 as an axis to impart like movement to plate 44. Accordingly the angular relation of plate or frame 44 to the vertical may be adjusted, i. e., the axis of rollers 46 toward and from a parallel relationship with rolls 32 and 40.

Accordingly, it will be seen that there has been provided three independent adjustments for determining the exact desired position of the rollers 46 with respect to rolls 32 and 40. More particularly, rollers 46 may be adjusted vertically toward or from rolls 32 and 40 by manipulation of the hand wheel 136 (Figures 1 and 5) to move the stud shaft 42 up or down via the threaded shaft 126. By manipulating handle 156 to rotate shaft 42 in either direction (Figures 2 and 6) plate or frame 44 may be pivoted about a vertical axis to move the rollers 46 toward or from a parallel relationship with a vertical plane passing through the axis of the rolls 32 and 40. Furthermore rolls 46 may be adjusted toward or from a parallel relationship with a horizontal plane passing through the axis of roll 40 by adjusting setting bolt 178 as has been described in detail above and as is shown in Figures 1 and 2. Accordingly, the precise position and relationship of the rollers 46 with respect to the rollers 32 and 40 can be determined by independent adjustments.

By these adjustments the rollers 46 may be so related to rolls 32 and 40 that the reinforced tape will feed around the rollers 46 and back between the nip of rolls 32 and 40 to form individual loops of the exact dimensions desired, and these loops, as they are formed into the completed flexible hose, will be maintained in uniform diameter and fed at a uniform rate away from the plate or frame 44 as the apparatus operates in the manner previously described with reference to Figures 3 and 4. Accordingly, there has been provided independent adjustments which will not only assure hose of uniform diameter formed by a continuous operation, but, because of the additional guiding action of the rollers 46 during initial formation, the base flows freely away from the point of formation to avoid jamming or other undesirable results.

While the tape 48 has been described herein as "adhesive" it is to be understood that this apparatus might operate with non-adhesive tape but with provision for applying a bonding agent to the overlapping portions of the loops before or shortly after initial formation thereof and such procedure is within the contemplation of this invention. However, our present experience indicates that in the operation of this apparatus it is preferable to have the tape in adhesive condition before it is fed into overlapping relation between rolls 32 and 40 as described above with reference to Figures 3 and 4.

Furthermore, while we have described the use of wire-reinforced tape when operating the apparatus disclosed therein, we are aware that other means may be employed for reinforcing the tape and the expression "wire-reinforced tape" as used in the following claims is intended to define any type of reinforced tape suitable for use with this apparatus, whether or not reinforced with wire.

It will thus be seen that the objects set forth above, among those made apparent from the preceding description, are efficiently attained by the described apparatus and method, but, since certain changes may be made in carrying out the above method and in the apparatus set forth without departing from the scope of the invention, it is intended that all matters contained in the above description and shown in the accompanying drawings shall be interpreted as illustrative and not in a limiting sense.

We claim:

1. In apparatus for continuously forming flexible hose of the wire-reinforced type having tape disposed helically in overlapping relationship including a pair of superimposed rolls, means for rotating said rolls, and means for supporting said tape helically and looped back on itself in said rolls, the combination of a frame extending above said rolls, supporting elements extending axially from said frame and in spaced relation substantially on an arc and above the nip of said rolls so that at least the first loop of said tape being formed passes over said elements in a helical path, and means for adjusting the position of said support and said elements with respect to said rolls.

2. In apparatus for continuously forming flexible hose of the wire-reinforced type having tape disposed helically in overlapping relationship the combination of a pair of superimposed rolls at least one of which has a pair of axially spaced grooves, means for supporting tape with wire adjacent one edge thereof in a helical loop with said wire in said grooves to maintain such helical shape including a frame extending above said rolls, supporting elements extending axially from said frame in spaced relation substantially on an arc above the nip of said rolls and positioned to support at least the first loop of said tape in such relationship, means for adjusting said frame about vertical and horizontal axes, and means for adjusting the vertical position of said frame with respect to said rolls.

3. In apparatus for continuously forming flexible hose of the wire-reinforced type having tape disposed helically in overlapping relationship including a pair of superimposed rolls, means for rotating said rolls, and means for supporting said tape helically and looped back on itself in said rolls, the combination of a frame extending above said rolls, supporting elements extending axially from said frame and in spaced relation substantially on an arc and above the nip of said rolls so that at least the first loop being formed passes over said elements in a helical path, means mounting said frame for pivoting about a vertical axis, and means associated with said last mentioned means for adjusting said frame about said vertical axis.

4. In apparatus for continuously forming flexible hose of the wire-reinforced type having tape disposed helically in overlapping relationship including a pair of superimposed rolls, means for rotating said rolls, and means for supporting said tape helically and looped back on itself in said rolls, the combination of a frame extending above said rolls, supporting elements extending axially from said frame and in spaced relation substantially on an arc and above the nip of said rolls so that at least the first loop being formed passes over said elements in a helical path, means mounting said frame for pivoting about a horizontal axis, and means for adjusting said frame to different positions about said axis.

5. In apparatus for continuously forming flexible hose of the wire-reinforced type having tape disposed helically in overlapping relationship including a pair of superimposed rolls, means for rotating said rolls, and means for supporting said tape helically and looped back on itself in said rolls, the combination of a frame extending above said rolls, supporting elements extending axially from said frame and in spaced relation substantially on an arc and above the nip of said rolls so that at least the first loop being formed passes over said elements in a helical path, and means for adjusting the vertical position of said frame with respect to said rolls.

6. In apparatus for continuously forming flexible hose of the wire-reinforced type having tape disposed helically in overlapping relationship including a pair of superimposed rolls, means for rotating said rolls, and means for supporting said tape helically and looped back on itself in said rolls, the combination of a frame extending above said rolls, supporting elements extending axially from said frame and in spaced relation substantially on an arc and above the nip of said rolls so that at least the first loop being formed passes over said elements in a helical path, means mounting said frame for adjustment about horizontal and vertical axes, and means for vertically adjusting the position of said supporting elements with respect to said rolls.

7. In the apparatus for continuously forming flexible hose of the wire-reinforced type having tape disposed helically in overlapping relationship including a pair of superimposed rolls, means for rotating said rolls, and means for supporting said tape helically and looped back on itself in said rolls, the combination of means for resiliently urging said rolls toward each other, a base, a frame having a stud shaft depending therefrom and pivotally mounted in said base, said frame extending above said rolls, means extending from said frame above said rolls and adapted to support at least one loop of said hose as it is formed by said rolls, means for rotating said shaft to pivot said frame about its vertical axis, and means for adjusting the position of said frame vertically with respect to said rolls.

8. In apparatus for continuously forming flexible hose of the wire-reinforced type having tape, disposed helically in overlapping relationship including a pair of superimposed rolls, means for rotating said rolls, and means for supporting said tape helically and looped back on itself in said rolls, the combination of means for resiliently urging said rolls toward each other, a base, a frame having a stud shaft depending therefrom and pivotally mounted in said base, said frame extending above said rolls, supporting means extending from said frame above said rolls and adapted to support at least one loop of said hose as it is formed by said rolls, means for rotating said shaft to pivot said plate about its vertical axis, means including a horizontal shaft disposed between said stud shaft and said plate to allow said plate to pivot about a horizontal axis, and means for adjusting the position of said frame about said horizontal axis.

9. The apparatus defined in claim 8 in which there is additional means for effecting vertical adjustment of said stud shaft to determine the position of said frame and said supporting means with respect to said rolls.

References Cited in the file of this patent

UNITED STATES PATENTS

| | | |
|---|---|---|
| 2,489,503 | Sampson et al. | Nov. 29, 1949 |
| 2,506,232 | Murphy | May 2, 1950 |
| 2,539,853 | Meyers et al. | Jan. 30, 1951 |